United States Patent [19]
Skogland

[11] Patent Number: 5,202,019
[45] Date of Patent: Apr. 13, 1993

[54] DEVICE FOR THE MECHANICAL SEPARATION OF INSOLUBLE SOLIDS FROM A LIQUID CONTAINING SAID SOLIDS

[76] Inventor: Magne Skogland, N-5540 Fordesfjorden, Fordesfjorden, Norway

[21] Appl. No.: 721,548
[22] PCT Filed: Jan. 24, 1990
[86] PCT No.: PCT/NO90/00016
§ 371 Date: Jul. 22, 1991
§ 102(e) Date: Jul. 22, 1991
[87] PCT Pub. No.: WO90/09352
PCT Pub. Date: Aug. 23, 1990

[30] Foreign Application Priority Data
Feb. 14, 1989 [NO] Norway ............... 890612

[51] Int. Cl.$^5$ ............... B01D 29/23; B01D 29/25; B01D 35/02
[52] U.S. Cl. ............... 210/159; 210/413; 210/414; 210/459; 210/435; 209/387
[58] Field of Search ............... 210/413, 414, 159, 459, 210/435, 497.01, 408, 358; 209/387, 388

[56] References Cited

U.S. PATENT DOCUMENTS

| | | | |
|---|---|---|---|
| 546,708 | 9/1895 | Pierce | 210/413 |
| 2,463,814 | 3/1949 | Skinner | 210/459 |
| 2,765,921 | 10/1956 | Green | 210/414 |
| 2,784,032 | 3/1957 | Johansson | 210/413 |
| 3,469,705 | 9/1969 | Thomas | 210/414 |
| 3,850,802 | 11/1974 | Berger | 210/413 |
| 4,328,098 | 5/1982 | Benson | 210/414 |
| 4,518,501 | 5/1985 | Lennartz | 210/413 |
| 4,624,785 | 11/1986 | Driori | 210/414 |
| 4,867,879 | 9/1989 | Müller | 210/408 |
| 5,106,500 | 4/1992 | Hembree | 210/414 |

FOREIGN PATENT DOCUMENTS

| | | | |
|---|---|---|---|
| 2437358 | 2/1975 | Fed. Rep. of Germany . | |
| 97216 | 7/1980 | Japan | 210/413 |
| 160990 | 3/1989 | Norway . | |
| 133463 | 3/1959 | U.S.S.R. | 210/414 |
| 768423 | 11/1980 | U.S.S.R. | 210/414 |
| 1493289 | 7/1989 | U.S.S.R. | 210/413 |
| 1533750 | 1/1990 | U.S.S.R. | 210/414 |

OTHER PUBLICATIONS

Water Hydrogeology, Derwent Publications Ltd. (87-333,263) Apr. 1987.

Primary Examiner—Stanley S. Silverman
Assistant Examiner—Thomas M. Lithgow
Attorney, Agent, or Firm—Ladas & Parry

[57] ABSTRACT

One has aimed at providing a simple, reliable and efficient purification device for the mechanical purification of sewage. At this end, the sewage purification device (1) comprises substantially a strainer pipe (2), which may be designed to be coupled to a sewage pipe (P1), and which is perforated in that portion thereof which, in the position of use, constitutes the bottom portion. The strainer pipe (2) is assigned a water collecting pipe (4) underlying the former in the position of use, extending parallely thereto and, preferably, being sealingly connected thereto, said water collecting pipe (4) being adapted to receive mechanically purified sewage from the strainer pipe (2). The water collecting pipe (4) is open or, respectively, provided with holes, perforations or slots in the portion thereof being opposite to the strainer pipe (2). Within the strainer pipe (2), which has an opening (6) at one end thereof, there is provided a scraper or pusher device (18, 18', 18") adapted to push out more or less solid sewage mass through said opening (6) of the strainer pipe (2).

3 Claims, 1 Drawing Sheet

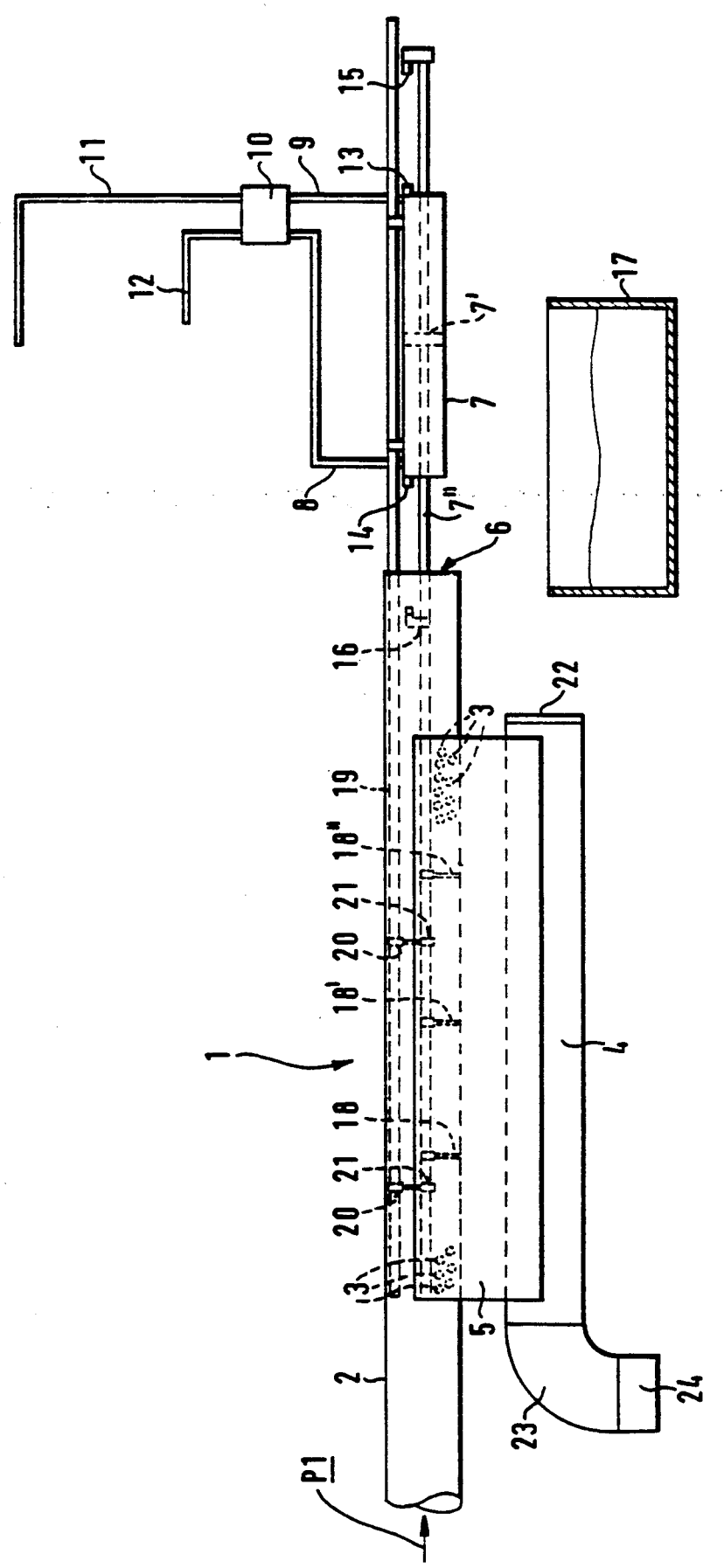

DEVICE FOR THE MECHANICAL SEPARATION OF INSOLUBLE SOLIDS FROM A LIQUID CONTAINING SAID SOLIDS

The present invention relates to a device for the mechanical separation of insoluble solids from a liquid containing said solids.

The invention is particularly concerned with the mechanical purification of sewage, but it may well be utilized for other separation purposes, such as are desired to take place in applications within the agricultural, chemical or food processing industries or other processing industries, wherein insoluble solids are to be separated from a liquid flow carrying such solids.

By sewage is meant polluted potable water. Other wast water admixed sewage is also considered as sewage. The sewage purification in question aims at removal of undesired matter from the sewage mechanically.

In purification plants for sewage, paper and other solid matter, the sewage mass, are removed from the sewage, for thereafter to be burried at suitable filling places.

The prime and running cost of known purification plants, including mechanical mills, are high.

According to the present invention one has aimed at providing a simple and cheap purification device which is reliable and efficient in use.

This object is achieved by means of a purification device characterized through the features defined in the following claims.

The sewage purification device in accordance with the invention comprises substantially a strainer pipe which may be formed for the connection to a sewage pipe. The straine pipe is formed with perforations covering the lower half of the pipe in the position of use. The perforations of the strainer pipe are so small that undesired solid substances, i.e. the sewage mass, cannot penetrate therethrough and, accordingly, the strainer pipe serves to drain off mechanically purified sewage.

The strainer pipe is assigned an underlying water collecting pipe receiving mechanically purified sewage. In its portion opposite the strainer pipe, the collecting pipe is open, respectively has openings, holes, perforations, slots or apertures. Preferably, strainer pipe and water collecting pipe are sealingly connected to each other across a longitudinal area covered by their opposing holes, so that all or the predominant portion of the sewage leaving the strainer pipe, with certainty enters the water collecting pipe.

In order to counteract that solid matter, the sewage mass, deposits and builds up in the strainer pipe, so that its through-going bores or perforations are clogged in whole or in part, thereby reducing the capacity/efficiency of the strainer pipe, the latter must be provided with an internal scraper or pusher device for removal of solid sewage mass through an opening at one end of the strainer pipe.

Said scraper or pusher device comprises pivotable carrier flaps suspended on a piston rod/piston rod extension included in a double-acting pressure cylinder, the carrier flaps being adapted to take a first, active position when being displaced in the same direction as the flowing direction of the raw sewage, and a second, inactive, swung-up position, wherein they may slide over underlying sewage mass, when displaced in the opposite direction, i.e. countercurrently with respect to the flowing direction of the raw sewage.

Advantageously, the carrier flaps may carry brushes or, respectively, be constituted through brushing means.

The invention is further explained in the following in connection with an example of a preferred embodiment illustrated diagrammatically through a single FIGURE on the accompanying drawing.

In the FIGURE on the drawing, a sewage purification device according to the invention is shown in side view/axial section.

In accordance with the FIGURE, the uncleaned sewage, the raw sewage, has the direction of flow as indicated by the arrow P1.

The purification device according to the invention is generally denoted by the reference numeral 1 and comprises mainly a strainer pipe 2, which may be designed to be coupled to a sewage pipe line (not shown) represented through the arrow P1.

In accordance with the embodiment shown, the strainer pipe 2—over a portion of the axial length thereof—is formed with perforations 3 covering that half of the pipe being the lowermost in the position of use.

The strainer pipe 2 is assigned a water collecting pipe 4 underlying the former in the position of use and being adapted to receive purified sewage from the strainer pipe 2, the collecting pipe 4 being provided with one or more apertures, slots, perforations or the like in its portion opposite the strainer pipe 2.

By preference, the two pipes 2, 4 are sealingly connected to each other across a longitudinal area covered by their holes. According to the FIGURE, this sealing connection is indicated by a lateral wall 5 (there being a corresponding lateral wall at the opposite side); the edges thereof may be welded to both pipes 2, 4. In this manner, the purification device may be made as a finished installable unit 2, 4, 5 comprising both strainer pipe and water collecting pipe.

In order to avoid that the partially dewatered sewage mass deposits and build up within the strainer pipe, resulting in wholly or partly clogging of its throughgoing bore and/or perforations 3, the strainer pipe 2 is provided with an internal scraper or pusher device for removal of more or less solid sewage mass through an opening 6 at the downstream end of the strainer pipe 2.

The scraper or pusher device is based on reciprocal displacement movement of carriers in the axial direction of the strainer pipe 2, said displacement movement according to the embodiment shown being effected by means of a double-acting water-driven pressure cylinder 7, the piston of which being denoted by 7', its piston rod by 7".

At each end cover, the pressure cylinder 7 is provided with a connecting piece for a water pipe 8, 9 leading to a four-way magnet valve 10, whereto is connected a network water pipe line 11 and a return water pipe line 12, leading to a sink not shown. Moreover, at each of the two end covers of the pressure cylinder 7, an end switch 13, 14 is provided, the piston rod 7" being assigned a downstream closing switch 15 and an upstream closing switch 16.

As mentioned, the downstream end of the strainer pipe 2 is provided with an opening 6 for the removal of more or less solid sewage mass. In order to receive this pushed-out mass, an underlying collecting vessel 17 is provided.

The scraper or pusher device proper for the strainer pipe 2 is constituted by a plurality (in the number of three in the embodiment shown) of equidistantly spaced carrier flaps 18, 18' and 18", which may be pivotably suspended directly on the piston rod 7", on a coaxial piston rod extension or on another suitable frame member driven by the piston rod 7". In the position of use, the pivot axes of the carrier flaps 18, 18', 18" extend horizontally. Each carrier flap is assigned a stop pin on the piston rod or its extension, prohibiting pivoting beyond vertically down-hanging position during displacement in the raw sewage's direction of flow P1, but which enables swinging-up of the carrier flaps during their displacement in the opposite direction, i.e. countercurrently to the raw sewage's direction of flow P1. Thus, during the latter movement, the carriers will turn upward and slide over solid sewage mass deposited at the bottom of the strainer pipe 2.

A longitudinal frame profile 19 carries casters 20 for holders 21 for the piston rod 7"/the piston rod extension. This suspension and guidance device may be substituted by any other suitable device.

The stroke of the piston rod 7" and the mutual spacing of the carrier flaps 18, 18' and 18" are such adapted to each other that the displacement distances of the individual carrier flaps partly overlap each other, securing an efficient pushing-out of solid sewage mass over the entire length of the strainer pipe.

The carrier flaps 18, 18', 18" may be provided with brushes or, respectively, constituted through brushing means. Such brushes may be fixed or pivotable and will, preferably, have a curved circumference corresponding to the cross-sectional shape of the pipe.

The water collecting pipe 4 is sealed at one end by means of a cleaning door 22; its other end via a bend 23 being equipped with a connecting piece 24, from where mechanically purified sewage may be returned to e.g. the main sewage pipe or, possibly, treated further.

I claim:

1. A device for the mechanical separation of insoluble solids from a liquid containing said solids, comprising first and second interconnected, mutually parallel pipes, said first pipe being in the form of a strainer pipe, said strainer pipe being provided with perforations over a substantial longitudinal portion thereof, said perforations being situated in the lower region of the strainer pipe when the latter is extending horizontally, said second pipe being in the form of a liquid-collecting pipe situated beneath and connected to the strainer pipe in opposing relationship thereto, said liquid-collecting pipe having aperture means in the longitudinal portion thereof opposing the perforated longitudinal portion of the strainer pipe, and receiving mechanically separated liquid from the strainer pipe, said strainer pipe having an end opening positioned axially outside the longitudinal perforated portion thereof and being internally provided with a scraper device for pushing out more or less solid substances collected on the bottom of said strainer pipe through said end opening of said strainer pipe, said scraper device comprising pivotable mounted carrier means suspended from an extension of a piston rod included into a double-acting pressure cylinder, said carrier means function to take a first, active position substantially perpendicular to the axial direction of said piston rod and its extension during displacement toward said end opening of said strainer pipe, as well as a second, inactive, swung-up position wherein said carrier means slide over underlying the solid substances accumulated in the bottom region of said strainer pipe during displacement in the opposite axial direction of said piston rod and its extension.

2. A device for the mechanical separation of insoluble solids from a liquid containing said solids, comprising first and second interconnected, mutually parallel pipes, said first pipe being in the form of a strainer pipe, said strainer pipe being provided with perforations over a substantial longitudinal portion thereof, said perforations being situated in the lower region of the strainer pipe when the latter is extending horizontally, said second pipe being in the form of a liquid-collecting pipe situated beneath and connected to the strainer pipe in opposing relationship thereto, said liquid-collecting pipe having aperture means in the longitudinal portion thereof opposing the perforated longitudinal portion of the strainer pipe and receiving mechanically separated liquid from the strainer pipe, said strainer pipe having an end opening positioned axially outside the longitudinal perforated portion thereof and being internally provided with a scraper device for pushing out more or less solid substances collected on the bottom of said strainer pipe through said end opening of said strainer pipe, said scraper device comprising pivotable mounted carrier means suspended from an extension of a piston rod included into a double-acting pressure cylinder, said carrier means functioning to take a first, active position substantially perpendicular to the axial direction of said piston rod and its extension during displacement toward said end opening of said strainer pipe, as well as a second, inactive, swung-up position wherein said carrier means slide over underlying the solid substance accumulated in the bottom region of said strainer pipe during displacement in the opposite axial direction of said piston rod and its extension, and wherein said carrier means carry brushes or, respectively, are constituted by brushing means.

3. The device as set forth in claims 1 or 2, wherein said strainer pipe and said liquid-collecting pipe are sealingly connected to each other by means of parallel lateral plates extending over the longitudinal portions of said pipes covered by said opposing perforations or aperture means, respectively, said lateral plates being welded to each of said pipes.

* * * * *